United States Patent
Hieber et al.

[15] 3,668,976
[45] June 13, 1972

[54] FLIGHT REFUELING RECEPTACLE HAVING PRESSURE-INERTIA RELEASE VALVE

[72] Inventors: Ellsworth E. Hieber, 1417 Liden Avenue, Glendale, Calif. 91201; Thomas P. Taquino, 310 Tonyon Road, Sierra Madre, Calif. 91024; Frank Edward Hillery, 30 West Las Flores Avenue, Arcadia, Calif. 91006

[22] Filed: March 23, 1970

[21] Appl. No.: 24,930

Related U.S. Application Data

[62] Division of Ser. No. 717,680, April 1, 1968.

[52] U.S. Cl. ................................... 91/422, 91/437, 92/129, 244/135 A
[51] Int. Cl. ................................... F15b 11/08, F15b 13/04
[58] Field of Search .............. 91/422, 222, 436, 437; 92/129; 244/135 A

[56] References Cited

UNITED STATES PATENTS

| | | | |
|---|---|---|---|
| 2,646,025 | 7/1953 | Deardorff | 91/436 |
| 2,858,804 | 11/1958 | Banker | 91/422 |
| 2,875,732 | 3/1959 | Hoffmann | 91/422 |
| 2,938,688 | 5/1960 | Trump | 244/135 A |
| 3,060,895 | 10/1962 | Acker et al. | 91/437 X |
| 3,118,349 | 1/1964 | Combs | 91/422 X |
| 3,390,616 | 7/1968 | Hammer | 91/422 |

*Primary Examiner*—Martin P. Schwadron
*Assistant Examiner*—Irwin C. Cohen
*Attorney*—Whann & McManigal

[57] ABSTRACT

A hydraulic actuator, which is particularly adapted for use with and to automatically release the locking means of an in-flight refueling nozzle, and contains a cylinder and piston structure connected with a piston rod, the piston having a piston head with an axial flow passage controlled by a valve normally spring-urged to a closed position, when the piston structure is in a holding position at one end of the cylinder, but adapted to open under a suddenly applied highly accelerating force and permit movement of the piston to the other end of the cylinder.

7 Claims, 5 Drawing Figures

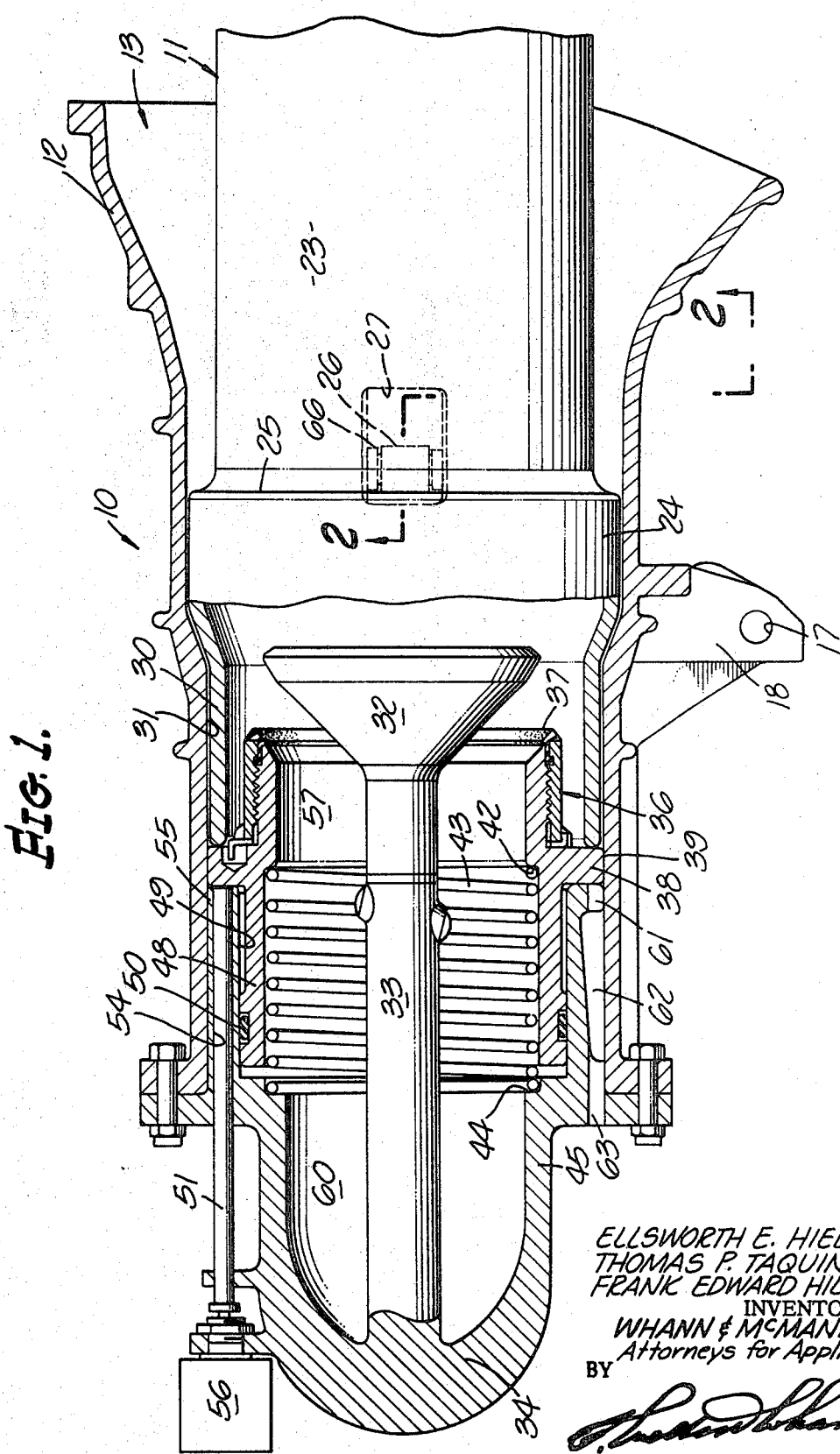

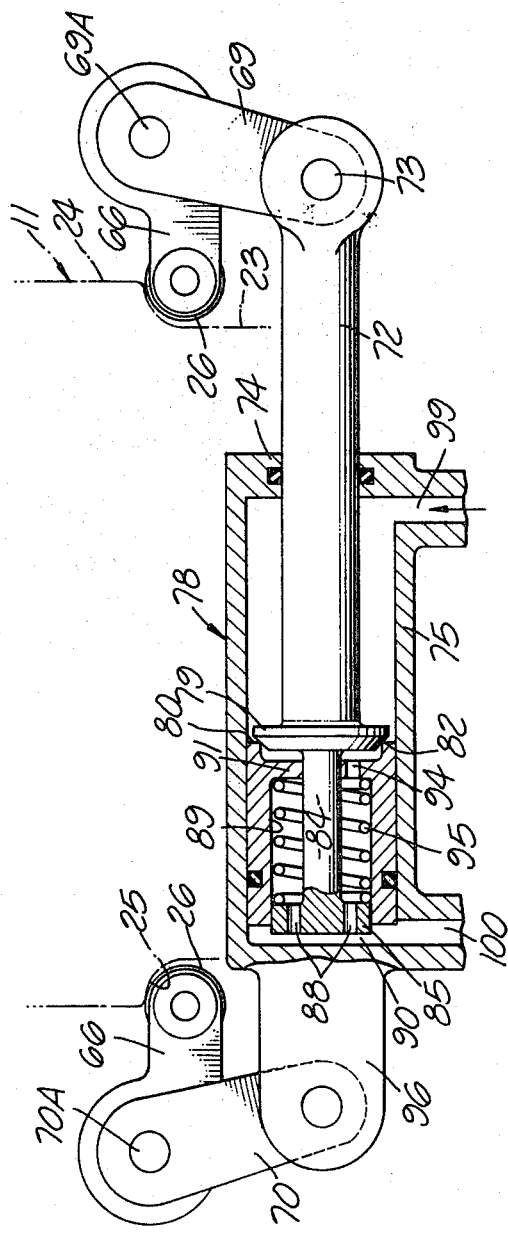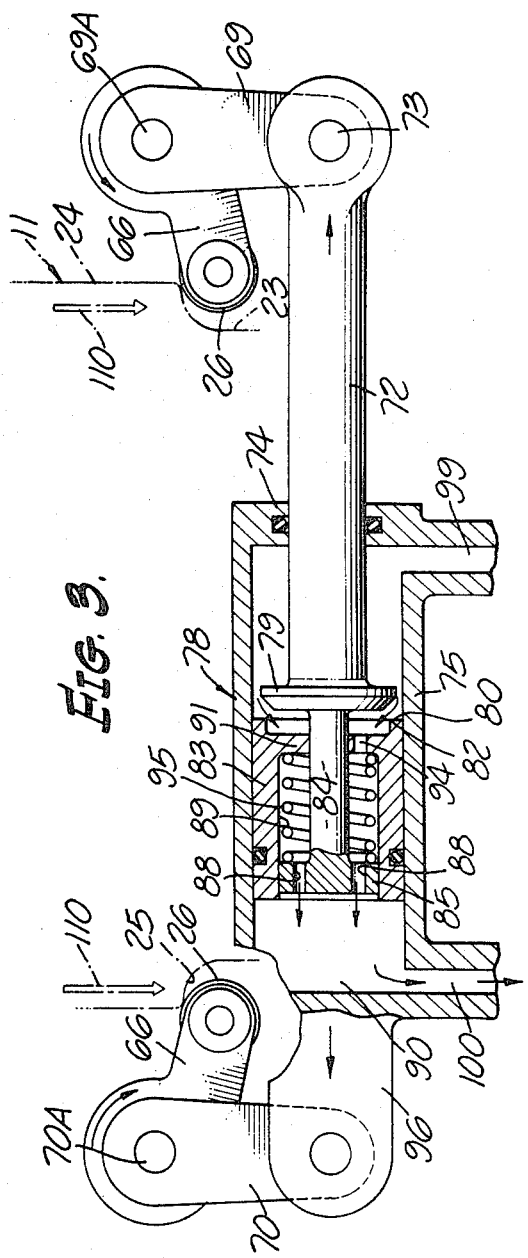

ELLSWORTH E. HIEBER
THOMAS P. TAQUINO
FRANK EDWARD HILLERY
INVENTORS.
WHANN & McMANIGAL
Attorneys for Applicants
BY

FLIGHT REFUELING RECEPTACLE HAVING PRESSURE-INERTIA RELEASE VALVE

This is a division of application Ser. No. 717,680, filed Apr. 1, 1968.

BACKGROUND OF THE INVENTION

The present invention is an improvement on that in United States Letters Patent to Trump, U.S. Pat. No. 2,938,688 for Retractable Receptacle for Flight Refueling. The present invention provides a receptacle or receiver, including means by which it is normally closed and sealed against the passage or leakage of fuel therethrough. It is designed to open and permit the passage of fuel when a nozzle from a tanker plane is operatively inserted and engaged in locking connection in the receptacle on the airplane being refueled. When operatively connected to the receptacle the nozzle cannot be readily withdrawn while fuel is being transferred to the airplane.

If and when the locking connection is released and the nozzle disengaged, the receptacle automatically closes and seals itself against passage or leakage of fuel.

The receptacle may be fixed within the airplane in a wing or in the fuselage of the airplane and having a cover which is removable inflight for refueling or the receptacle may be mounted so that it may be moved to an extended position for refueling and retracted when the refueling has been completed.

In normal operation, the nozzle, which is on a trailing end of a fueling boom extending from the tanker, is locked into the receptacle automatically when engagement is complete by means of an electrically operated circuit which causes hydraulic fluid to be supplied to a pressure actuator through an electrically operated hydraulic valve. Normal release of the latching device or lock is accomplished upon completion of the refueling operation by deenergizing the circuit through an operator-controlled switch, either on the tanker aircraft, receiver aircraft or both, at which time the refueling boom may be withdrawn from the receptacle and retracted to its stowed position.

In actual operations of such systems it has been found that inadvertent separation of the nozzle from the receptacle in the receiver aircraft sometimes occurs due to turbulent air or other contingencies arising from close formation flying, and that frequently the separation is of such a violent character that damage to the receiver or tanker aircraft occurs due to the inability of the hydromechanical latching device to effect a rapid release. The present invention provides a means for releasing the latching device in an effective manner for any combination of separation velocities likely to be encountered in service.

In the early inflight fueling systems, no type of release valve was used and displaced fluid from the hydraulic cylinder of the pressure actuator was displaced into the hydraulic supply line upon emergency disconnect. In a later state of the art, a relief valve was placed in the cylinder supply line to relieve at a preset pressure, and in a more sophisticated design a relief valve was incorporated into the piston head in the hydraulic cylinder. In all of these prior art devices, a rapid disconnect, in the range of 10 feet per second, resulted in dangerously high hydraulic pressures and disconnect forces, especially at extreme temperatures, such as minus 65° F. when the fluid viscosity of the hydraulic fluid is such as to resist free flow.

SUMMARY OF THE INVENTION

The latching device, according to the invention, is such that tension (retraction) of a hydraulic cylinder of a pressure actuator urges a lock to the latched position. The piston within the cylinder is constructed of two halves, the rod half incorporating a normally closed relief valve poppet, and the other half consisting of a piston head with a relief valve seat and a spring within the piston head to hold the poppet closed and to provide a preset release pressure. External forces tending to release the lock are applied to the piston rod and through the spring to the poppet head. Such forces occur when the nozzle is being pulled away from the receptacle in which it is locked or when the receptacle is under the same circumstances being pulled away from the nozzle.

If the external force is of a gradually applied nature, the pressure on the latching side of the cylinder will gradually increase until its predetermined cracking pressure is reached, to unlock the receptacle from the inserted nozzle. However, if the load applied is in the nature of a highly accelerating force, the inertia forces of the piston head, the spring and the supporting column of fluid tend to remain at rest, thus permitting the piston head and poppet to separate at a lower external force or hydraulic pressure than the preset cracking pressure for the poppet. The opening through the piston head presented when the poppet is unseated is of a relatively large area offering little flow resistance of the hydraulic fluid from the latching side of the cylinder to the other side of the piston head and from which the fluid is permitted to flow out of the cylinder. However, actual flow out of the cylinder need not occur because the volume displaced by the poppet or rod end is less than that displaced by the piston head without the rod.

Therefore, it is possible to effect rapid emergency disconnects at a lesser force than that required for a slow break-away when the external force is gradually increased causing the hydraulic pressure to increase to that necessary pressure to life the poppet off the seat. To prevent rapid emergency disconnects at too small an external force, it is only necessary to provide orificing of the hydraulic fluid in the piston head downstream of the seat and of the piston rod poppet.

An object of the invention is to provide an improved receptacle and fueling valve for inflight fueling and having a pressure actuated lock which will permit emergency disconnects without damaging the tanker aircraft or the receiving aircraft.

Another object of the invention is to provide a locking device for an inflight fueling receptacle for a receiving aircraft that will permit an emergency release of a nozzle from a tanker aircraft due to a highly accelerating force at a lesser force than that required when the external force tending to cause such a release is gradually increased until a predetermined release force is applied.

Still another object of the invention is to provide a hydraulic pressure actuator for locking a nozzle into a receptacle, as described in the preceding paragraphs, in which in a cylinder of the pressure actuator, the inertia forces of the piston head, of a piston relief poppet spring, and of the supporting column of hydraulic fluid tend to remain at rest when a highly accelerating external force tends to separate the nozzle and receptacle, the latter type of force being permitted to separate the piston head and the relief poppet at a lower external force or hydraulic pressure than the preset cracking pressure.

It is a further object of the invention to provide a receptacle and hydraulic actuator for locking the receptacle onto a fueling nozzle, as described in the preceding paragraphs, that will permit rapid emergency disconnects of the nozzle and receptacle at a lesser external force than that required for a slow break-away of the nozzle from the receptacle.

It is a still further object of the invention to provide a hydraulic actuator, as described in the preceding paragraphs, which will permit rapid emergency release of the actuator from its holding or operating position at a lesser external force than that required by a gradually increased applied external force for releasing of the actuator from its holding or operating position.

Further objects and advantages of the invention may be brought out in the following part of the specification, wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a cross-sectional view illustrating a refueling receptacle within a receiving aircraft, the valves of the receptacle being shown as having been opened by means of a fueling nozzle from a tanker aircraft, the nozzle having been inserted into the receptacle and locked in position for fueling;

FIG. 2 is a schematic view of a hydraulic actuator associated with the receiving receptacle, the actuator having been operated so as to lock the fueling nozzle within the receptacle, taken substantially as indicated along the line of 2—2 of FIG. 1;

FIG. 3 is a schematic view of the aforesaid hydraulic actuator, illustrating the operation of the actuator and lock as external forces are being applied through the nozzle to cause the lock to release the nozzle to permit disconnection of the nozzle and receptacle;

DESCRIPTION OF THE PREFERRED EMBODIMENT

Figure 4:
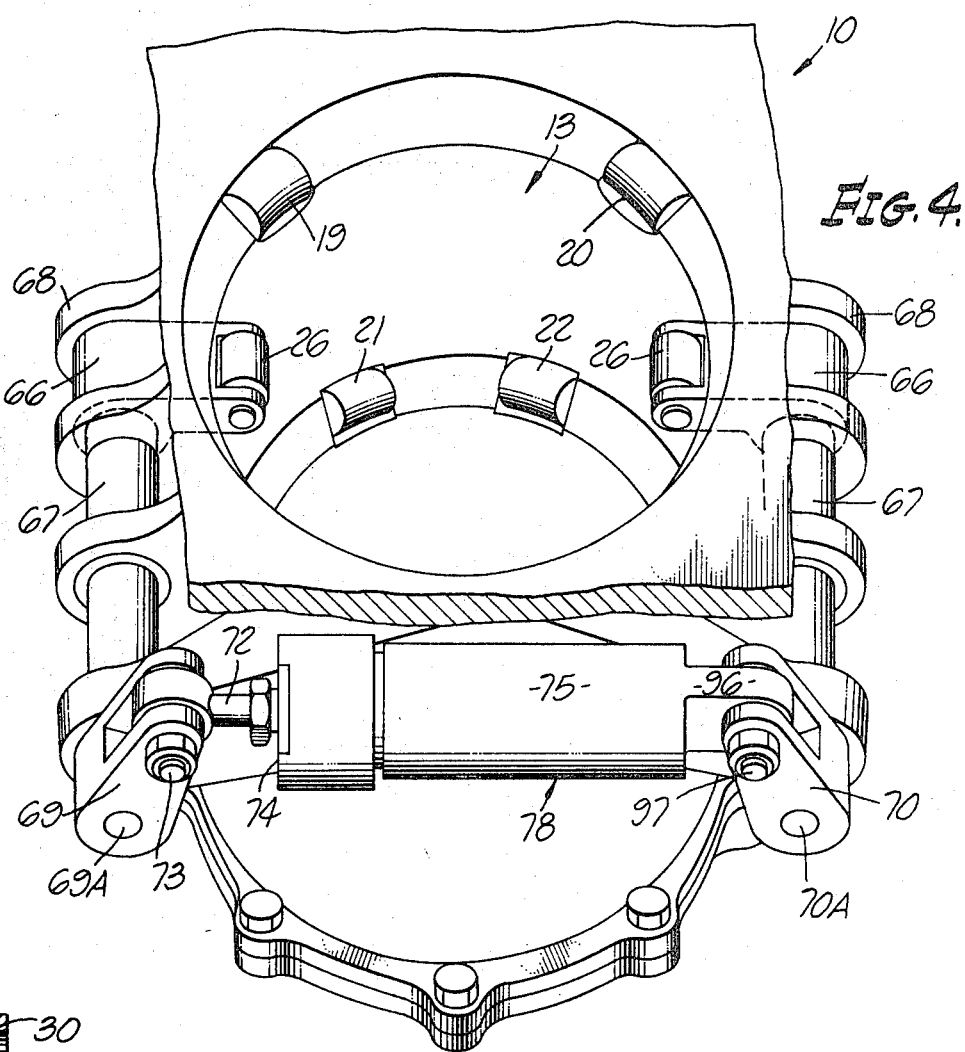
FIG. 4 is a perspective end view illustrating the receptacle, the hydraulic actuator and the locking means operated by it in the locking position.

Referring again to the drawings, there are shown in FIGS. 1 and 4, a fueling receptacle generally designated as 10 adapted to be secured within the wing or fuselage of an aircraft to be refueled while in flight, and a nozzle 11 locked within the receptacle in FIG. 1 and which is adapted to be extended from and trail rearwardly of a tanker aircraft during a fueling operation. The receptacle has an enlarged conical shaped open end 12 having an opening 13 to receive the nozzle 11 by maneuvering of one or both of the aircraft during flight. The receptacle may be affixed within the aircraft and have a removable cover or may be positioned in a wing or the fuselage in which it may be pivoted upwardly by means not shown at a hole 17 in a hinge-supporting member 18. In FIG. 4 there are shown rollers 19, 20, 21 and 22, not shown in FIG. 1, to guide the nozzle and to make its entry into the receptacle relatively frictionless.

The nozzle 11 has a small diameter portion 23 from which extends an enlarged diameter portion 24 and on which is formed a shoulder 25 adapted to be engaged by lock rollers 26, which when moved radially inwardly into the receptacle through diametrically opposed openings 27 lock the nozzle within the receptacle. In FIGS. 1 and 4 the locking rollers are shown in the locking position. In FIG. 1 inwardly of the portion 24 of the nozzle is a leading end, small diameter portion 30 which is complementary to an interior cylindrical and reduced diameter portion 31 of the receptacle.

Within the receptacle portion 31 is a fixed conical shaped valve member 32, supported on a stem 33 which is secured to an inner end 34 of the receptacle. Slidably engaged within the cylindrical portion 31 is a sleeve, generally designated as 36. At its outer end the sleeve has a sealing member 37 which is adapted to normally seat on the valve 32 to close the valve and to seal the receptacle.

Extending radially outwardly on the sleeve is an annular flange 38 which has a circumferential surface 39 slidably engaged with the interior surface 31. Internally of the flange 38 on the sleeve is a radially directed shoulder 42 on which an outer end of a coil spring 43 abuts to hold the seal 37 of the sleeve in its normally closed, valve position. The other end of the spring is in abutment with a radially directed shoulder 44 internally in the receptacle on a wall portion 45. An outer portion of the sleeve 48 is slidably engaged with an internal cylindrical surface 49 of the receptacle and an O-ring 50 provides the seal between the sleeve and the receptacle.

As may be seen in FIG. 1, the inward movement of the nozzle portion 30 has moved the sleeve off of the valve 32 to open it as the nozzle was inserted into the receptacle when the end portion 30 of the nozzle contacted the annular flange 38 of the sleeve. A switch rod 51 is slidably engaged in a bore 54 in a wall portion 55 of the receptacle. When the valve 32 is closed the rod normally extends upwardly beyond the wall portion 55 so that as the nozzle portion 30 moves the flange 38 inwardly it contacts the rod 51 to close a switch 56 which causes the locking members 26 to be moved to locking engagement with the shoulder 25 of the nozzle. At this time the receiving aircraft is then in condition to receive the fuel through the nozzle and which flows into the open portion 57 of the sleeve and into the receptacle portion 60. From the receptacle portion 60 the fuel flows into the fueling system of the aircraft through an opening in the receptacle, now shown, extending at an angle to the surface of the drawing outwardly of the receptacle portion 60. In the wall portion 55 of the receptacle diametrically opposite the switch rod is a bore comprised of three parts 61, 62 and 63 and which provides a passage to permit flow of any fluid externally of the seals 50 and 37 to be discharged to prevent the buildup of any pressure that might otherwise prevent the inward movement of the flange 38 by the nozzle portion 30.

In FIGS. 2, 3 and 4 the latching mechanism is illustrated. The locking rollers 26 are mounted on levers 66 which are fixed to rotate with shafts 67, mounted for rotation in ears 68 which support the locking mechanism on the receptacle. The shafts 67 at their other ends are fixed to be rotated by means of levers 69 and 70. The lever 69 is pivotally secured to a piston rod 72 so that movement of the rod causes the lever 69 to be pivoted at the point 73. The rod 72 is slidably and sealingly engaged in one end 74 of a cylinder 75 of a hydraulic pressure actuator generally designated as 78. The pressure actuator is drawn schematically in FIGS. 2 and 3 for convenience whereas its actual appearance is shown FIG. 4.

The rod 72 within the cylinder has a poppet valve 79 which is adapted to seat at 82 as shown in FIG. 3 on a piston head 83, inwardly of a circumferentially extending surface 80, and which with the poppet valve 79, when closed, form the complete piston structure, and which is slidably and sealingly engaged within the cylindrical wall of the cylinder 75. Extending from the poppet 79 is a stem 84 having on its end an annular flange 85. The flange 85 has a plurality of passages 88. The flange 85 is slidably engaged in a cylindrical well 89 in the piston head 83. One end of the well is open to the cylinder end portion 90. The other end of the well is formed of a wall 91 extending transversely within the piston head and which has an orifice 94 in communication with the well 89 and the poppet 79. Surrounding the stem 84 and abutting the flange 85 at one end and the wall 91 at the other is a coil spring 95 adapted to hold the poppet 79 in its normally closed position as shown in FIG. 2.

Outwardly of the end 90 of the cylinder is a link 96, pivotally connected to the link 70 at 97. Adjacent the end 74 of the cylinder is a hydraulic fluid conduit 99 and adjacent the other end of the cylinder 90 is a hydraulic fluid conduit 100.

As shown in FIG. 2, when the locking rollers are in locking position on the shoulder 25 of the nozzle the hydraulic actuator 78 is in its retracted position with the piston being adjacent the end 96 of the cylinder. Thus, as indicated in FIG. 3, when the piston and rod 72 moves toward the right in the drawing, the link 96 on the cylinder moves to the left so as to pivot the links 69 and 70 at 73 and 97, respectively. Since the other ends of the links 69 and 70 are fixed to rotate at 69A and 70A respectively, the pivoting movement resulting from the linear movement of the pressure actuator parts causes the lever 66 to be rotated so that the rollers 26 are also rotated outwardly toward the open end of the receptacle so as to be moved off of the shoulder 25 on the nozzle. Similarly, when hydraulic fluid pressure is applied through the conduit 99 the piston is moved toward the end 90 of the cylinder and the levers 66 are moved into the locking position with their inner ends having the rollers 26 in contact with the shoulder 25 of the nozzle.

Figure 5:
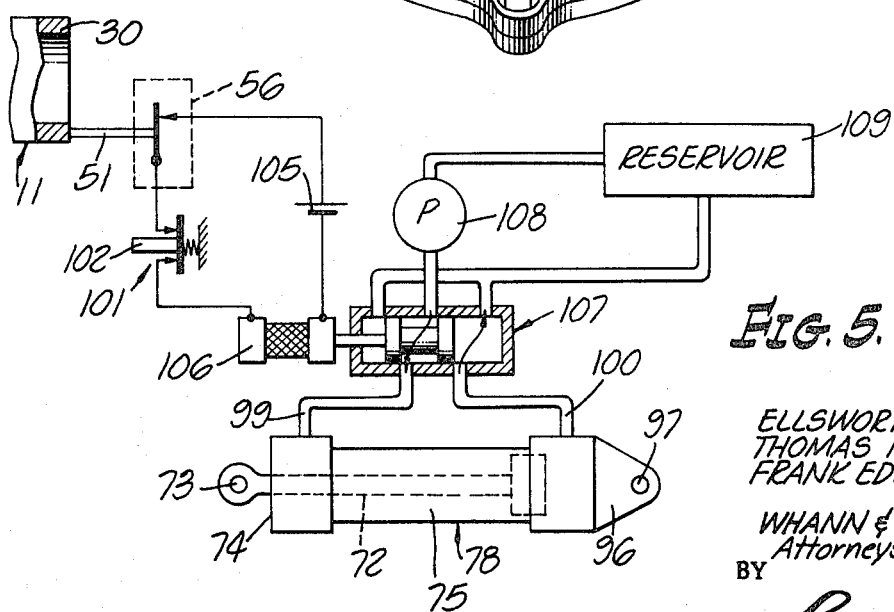
FIG. 5 is schematic view of the hydraulic and electrical circuitry for locking and unlocking the latching device for holding the fueling nozzle in the receiving receptacle during fueling.

Now referring to FIG. 5, which schematically illustrates a representative type of electrical circuitry and the hydraulic fluid circuitry, there is shown the leading end 30 of the nozzle 11 having closed the switch 56 by movement of the rod 51, as shown in FIG. 1, so as to close the circuit. The circuit also has a normally closed spring-held switch 101 which can be opened from the cockpit of the receiving aircraft by means of the rod 102. When the circuit is closed by the normally opened switch 56, a power source 105 actuates a solenoid 106 so as to operate the slide valve 107 to move it from its normal position which permits the flow of hydraulic fluid through the circuit 100 so that if pressure is applied, the piston will be moved to the right in FIGS. 2 and 3 and to the left in FIG. 5 to extend the actuator and to open or hold open the locking rollers 26. The flow of hydraulic fluid into the cylinder through conduit 99 causes the piston to be moved to the left in FIGS. 2 and 3 and to the right in FIG. 5 to retract the actuator and to close or hold closed the locking rollers 26.

In the hydraulic circuit there is a pump 108 and a hydraulic fluid reservoir 109 as shown in FIG. 5. When the pump 108 is connected to the conduit 100 the conduit 99 from the cylinder is connected to the reservoir. Thus, if pressure was applied by the pump so as to cause the piston to move from a locking position to an unlocking position fluid would flow into the conduit 100 and cylinder end 90 and out of the cylinder end 74 and into the conduit 99 and back to the reservoir. The pump 108 is energized by a separate circuit, not shown, although it could be energized by the sliding valve circuit shown for purposes of locking the nozzle within the receptacle. The switch 101 may be opened for emergency purposes and if pressure is maintained, as it normally would be, by means of the pump 108, the opening of the switch 101 would reverse the flow of movement of the slide valve to its normal position by deenergizing the solenoid 106 so as to cause the pressure to be applied through the conduit 100 to effectively extend the pressure actuator and move the rollers out of the path of the nozzle by rotation of the lever 66.

However, the invention here relates to the release of the locking mechanism by external forces acting on nozzle and receptacle as indicated by the arrows 110 in FIG. 3. These arrows 110 indicate direction of external forces which would tend to move the nozzle outwardly of the receptacle and thus also tend to rotate the levers 66 and thereby extend the actuator from its contracted position to its open extended position. During such applied forces the pressure would increase causing the spring 95 to compress and causing the poppet 79 to be moved off of the seat to permit the discharge of pressurized fluid entering the cylinder through the conduit 99. Thus when the poppet 79 is open this pressure is dissipated through the orifices 94, the well 89 and the orifices 88.

The spring 95 has a force of 260 lb. to maintain the poppet 79 on its seat 82. During normal operation, the hydraulic pressure applied to the poppet 79 and to the area 80 of the piston head outwardly of the poppet is 3,000 lb. per square inch. Because of the area 80 on the piston head, and the 260 lb. on the spring, the preset cracking pressure for the poppet 79 is 3,400 lb. per square inch. Thus, when a force is applied in a direction of the arrow 110 and gradually increased, the hydraulic actuator will be extended in the direction shown in FIG. 3 and the piston head will lift off of the poppet when the internal pressure within the cylinder reached 3,400 lb. per square inch. This 3,400 lb. per square inch corresponds to a gradually increased external force on the nozzle in the direction of the arrows 110 of a maximum of 4,500 lb.; that is, the gradually increased external force of 4,500 lb. corresponds to the 3,400 lb. per square inch of the preset cracking pressure internally in the cylinder. However, according to the invention, if the load applied externally in the direction of the arrows 110 is in the nature of a highly accelerating force, the inertia forces of the piston head 83, the spring 95, and the supporting column of fluid acting upon the piston head tend to cause the items to remain at rest to permit the piston head and the poppet to separate at a lower internal hydraulic pressure than the 3,400 lb. preset cracking pressure. Correspondingly, the highly accelerated force in the direction of the arrows 110 on the rollers and levers 66 is lower than the 4,500 lb. gradually applied external force. Any highly accelerating force in contrast to a gradually increasing force will cause the poppet end and piston head to be separated at a lower internal pressure than the 3,400 lb. and a lower external force than the 4,500 lb. but the greater amount of acceleration will cause a greater differential; that is, lower, in the force that will cause the disconnection.

This type of lower force separation is of considerable benefit in that, where it does not exist in the prior art when the external separation forces are of a violent and accelerating nature damage to the receiver or tanker aircraft occurs due to the inability of the prior art latching devices to effect a rapid release. Thus, it is of considerable benefit to obtain a very rapid release when the external forces are rapidly accelerated. Consistent with this, when the external forces are applied gradually, in many cases they subsequently are reduced before the preset pressure is obtained to prevent the actual separation of the nozzle and receptacle. That is, if the external forces are applied gradually, frequently they never rise to a high enough point to actually cause separation and this, of course, is desirable so that the fueling can continue. According to the invention, separation pressure for a gradually applied force is selected to be a maximum safe pressure for separation of the nozzle and receptacle and because the more damaging type of separations, those caused by accelerating forces and permitting separation, occur at a lower pressure than the latter invention permits the higher maximum separation pressure for gradually applied forces which without the benefits of the invention would have to be substantially decreased so that there would not be damage done by the accelerating forces that would cause separation. In other words, the present invention permits a higher separation force for gradually applied external forces than would be possible without the invention.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example. We do not wish to be restricted to the specific form shown or uses mentioned except as defined in the accompanying claims, wherein various portions have been separated for clarity of reading and not for emphasis.

We claim:
1. In a hydraulic actuator:
 a. a hydraulic cylinder;
 b. a fluid conduit to one end of said cylinder and a second fluid conduit to the other end of said cylinder,
 c. a piston slidably engaged within said cylinder,
 d. said piston being positionable within said cylinder by means of internal pressure of hydraulic fluid from at least one of said conduits, said fluid forming a column in said cylinder on one side of said piston, and
 e. external movable means operably connected with said piston by a piston rod for movement thereby from a non-holding position to a holding position.
 f. extend movable means being operable by said piston rod in accordance with the position of said piston within the cylinder and in accordance with the fluid pressure applied to said piston,
 g. said external movable means in said holding position being adapted to apply a holding force in accordance with the fluid pressure on said piston,
 h. the improvement comprising:
 i. a single valve means defined between said piston and said piston rod, and means cooperating between said piston and piston rod for normally maintaining said valve means in closed position, said valve means being movable to open position to permit rapid emergency release of said external movable means from its holding position and dissipation of its holding force by the application of a lower but highly accelerated external force on said external means than required by a gradually increased applied external force for release of said external movable means.

2. The invention according to claim 1 in which:
a. said valve means comprising a relief valve on said piston rod adapted to open and release said fluid at a predetermined force applied externally in a direction tending to release said external means from its holding position when said latter force is gradually applied and increased,
b. and when said highly accelerating force is applied externally in a direction tending to release said external movable means; the inertia forces of the piston and of the column of fluid tend to remain substantially at rest to permit the relief valve to open and release said fluid at said external lower force.

3. The invention according to claim 2 in which:
a. said piston is formed of a piston head and of said relief valve when it is closed,
b. passage means extending through said head and providing communications from one side of said piston head and cylinder to the other when said relief valve is open; and
c. the means normally maintaining said valve in a closed position comprises a spring within said piston head to hold said relief valve closed with an internal predetermined force,
d. said fluid column applying said internal pressure in one direction to hold said external movable means in its holding position and to apply an additional force to hold said relief valve closed,
e. said internal force within said piston head and the force of said fluid pressure in said one direction providing a total internal predetermined force effectively equivalent to correspond to said required gradually increased external force for said release of said movable means from its holding position.

4. The invention according to claim 3 in which:
a. said relief valve is a poppet seated on said piston head when closed,
b. said poppet being connected to an inner end of said piston rod,
c. said rod extending through a first end of said cylinder and being slidably and sealingly engaged in said first end,
d. said outer end of said rod being connected with said external movable means and being adapted to receive said external forces tending to release said external movable means from its holding position and so as to tend to open said poppet.

5. The invention according to claim 4 in which:
a. a second end of said cylinder opposite said first end being connected to a second external movable means,
b. said piston being relatively adjacent said second end and said rod being in the farthermost inwardly position in the cylinder when said external movable means is in the holding position,
c. said rod and said second end having been moved away from each other in the nonholding position.

6. The invention according to claim 5 in which:
a. said spring biases said poppet to a normally closed position on a seat on said piston head,
b. said piston head having an annular portion extending radially outwardly from said seat,
c. said annular portion having a radially directed face on said one side upon which said internal pressure in said one direction is applied,
d. said poppet having a radially directed annular surface upon which said internal pressure in said one direction is applied;
e. said annular face on said piston head having a predetermined area to predetermine the cracking pressure at which the poppet will open relative to the force of said spring and said internal pressure and to the external forces applied to release said external movable means.

7. The invention according to claim 3, wherein the piston head includes an end wall positioned inwardly of said relief valve, and said passage means includes an orifice in said end wall.

* * * * *